United States Patent
Baack

[11] Patent Number: 5,934,729
[45] Date of Patent: Aug. 10, 1999

[54] ENERGY-ABSORBING FASTENER SYSTEM

[75] Inventor: David G. Baack, Ypsilanti, Mich.

[73] Assignee: Ford Global Technologies, Inc., Dearborn, Mich.

[21] Appl. No.: 08/812,885

[22] Filed: Mar. 10, 1997

[51] Int. Cl.[6] ................................................. F16B 19/00
[52] U.S. Cl. ..................... 296/39.1; 296/189; 296/146.7; 411/510
[58] Field of Search ............................... 296/39.1, 146.7, 296/214, 188, 189; 280/751, 752; 52/511; 411/338, 339, 508, 509, 510, 913

[56] References Cited

U.S. PATENT DOCUMENTS

| | | | |
|---|---|---|---|
| 4,270,328 | 6/1981 | Page et al. | 296/146.7 X |
| 4,568,215 | 2/1986 | Nelson | 52/511 X |
| 4,861,208 | 8/1989 | Boundy | 411/339 |
| 4,923,542 | 5/1990 | Janicki et al. | 296/146.7 X |
| 5,169,204 | 12/1992 | Kelman . | |
| 5,339,491 | 8/1994 | Sims | 411/339 X |
| 5,362,102 | 11/1994 | Hajack et al. . | |
| 5,419,606 | 5/1995 | Hull et al. | 296/39.1 X |

FOREIGN PATENT DOCUMENTS

| | | | |
|---|---|---|---|
| 0894791 | 8/1953 | Germany | 411/508 |
| 406270672 | 9/1994 | Japan | 296/146.7 |

Primary Examiner—Joseph D. Pape
Assistant Examiner—Chad D. Wells
Attorney, Agent, or Firm—David B. Kelley

[57] ABSTRACT

An energy-absorbing fastener assembly is used to mount an automotive trim panel in spaced relation to a structural member, such that an actuation load impingent on the panel causes the panel to deflect toward the structural member while the fastener assembly absorbs at least part of the kinetic energy. The fastener assembly can include a male fastener element movable into a socket to cause deflectable walls on the fastener element to frictionally engage the socket surface so as to absorb energy associated with trim panel deflection.

6 Claims, 2 Drawing Sheets

ENERGY-ABSORBING FASTENER SYSTEM

BACKGROUND OF THE INVENTION

1. Field of the Invention

This invention relates to an energy-absorbing fastener system, and particularly to such a system usable to fasten an automotive trim panel to a structural member, such that the trim panel can deflect toward the structural member to absorb impact energy when a load is incident on the trim panel.

2. Prior Developments

In order to reduce the effects of impact against a trim panel, it has been proposed to incorporate energy-absorbing devices into the trim panels. In many vehicles the trim panel absorbs some impact energy, while the fasteners act as hard points incapable of absorbing impact energy. In some cases, the energy-absorbing function has been built into the fasteners used to retain the trim panel in spaced relation to an associated outer structural member. The present invention is concerned with a trim panel fastener adapted to absorb some of the impact energy.

U.S. Pat. No. 5,169,204, issued to J. Kelman, discloses a vehicle door system wherein inner and outer panels are spaced apart by fasteners that include shock absorber devices for absorbing impact forces. In one case, the shock absorber comprises a viscous gel contained in a piston-cylinder assembly for extrusion through small openings in the piston. In another case, the shock absorber comprises a hemispherical enlargement formed of an elastic material so that it undergoes a squeeze deformation in order to pass through a restricted opening in the outer panel.

U.S. Pat. No. 5,362,102, issued to U. Hajek et al, discloses an impact energy-absorbing fastener that includes a fastener pin having three axially spaced circumferential ribs designed to undergo radial squeeze deformations to pass through a central hole in a fixed structural member. The energy absorption during the stroking action (also referred to as snubber action) is discontinuous and irregular. While each projection is expanding to its original configuration the deceleration rate of the panel will vary resulting in a less than optimized system. Additionally, at column 2, lines 34 and 35, the patentee indicates that the normal position of the fastener is defined by stops; such stops would likely interfere with the desired stroking action of the fastener.

SUMMARY OF THE INVENTION

The present invention relates to an energy-absorbing fastener system adapted for use between an inner automotive trim panel and a structural support member. The fastener system is designed to retain and space the trim panel from the structural member while allowing the panel to deflect toward the structural member in a controlled fashion when a load is incident upon the trim panel. The fastener system is designed to absorb energy associated with an actuation load of predetermined magnitude which is greater than an installation load required to attach the trim panel to the structural member.

In preferred practice of the invention, each fastener assembly comprises a socket installed between the structural member and a male fastener element capable of movement into the socket during deflection of the trim panel. The fastener element has a series of axially spaced deflectable walls adapted to frictionally engage the socket internal surface for absorbing energy. Additional energy is absorbed through plastic deformation of the walls. Such deflectable walls are constructed and spaced so that substantial frictional retarding forces are developed as the fastener element moves through the socket. The aim is to achieve a relatively high and continuous energy absorption rate throughout the stroke of the fastener element.

Specific features and advantages of the invention will be apparent from the attached drawings and description of a preferred embodiment of the invention.

DESCRIPTION OF THE PREFERRED EMBODIMENTS

Figure 1:
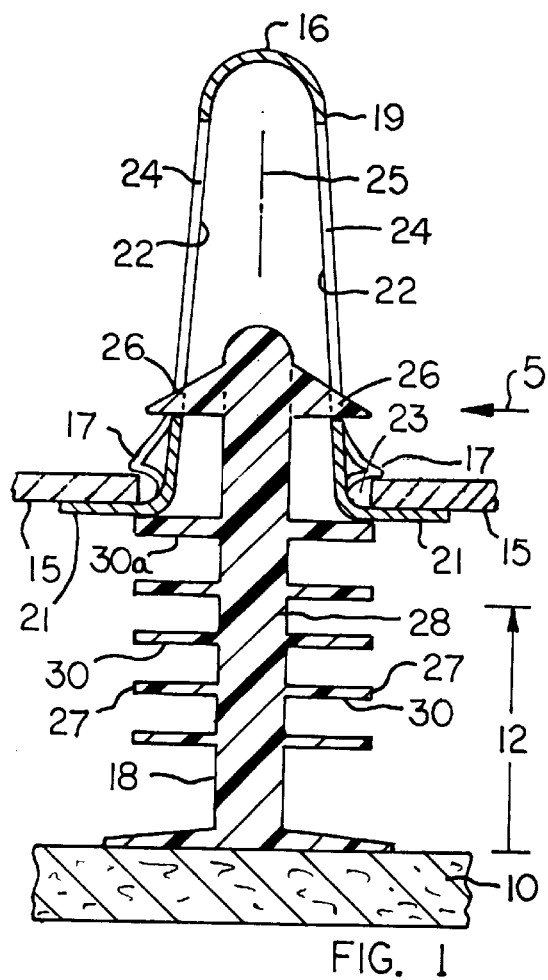
FIG. 1 is a sectional view taken through a fastener assembly embodying the invention.
Figure 2:
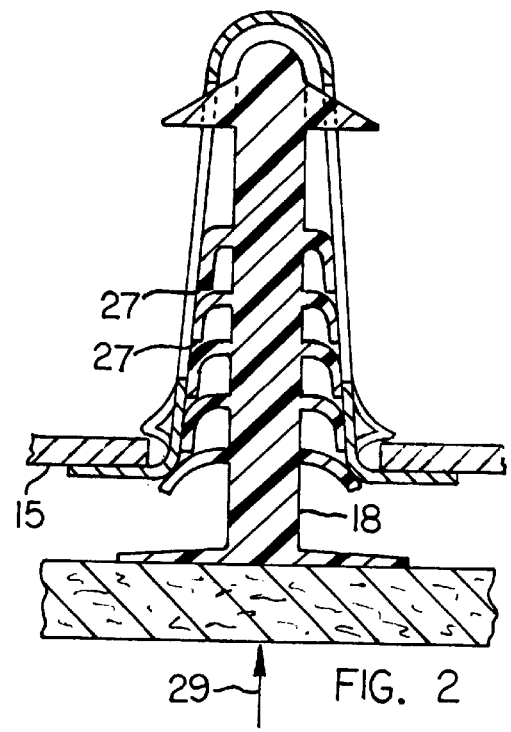
FIG. 2 is a view taken in the same direction as FIG. 1, but showing the assembly in a deflected condition.

FIGS. 1 through 5 show a single energy-absorbing fastener assembly used to retain an automotive trim panel 10 in spaced relation to a structural member 15, whereby an actuation load of predetermined magnitude impingent on the trim panel 10 causes the panel to deflect toward member 15 as indicated by arrow 29 in FIG. 2. The actuation load is greater than an installation load required to attach the trim panel to the structural member. Numeral 12 depicts the stroke of the panel. The actuation load, or impact force, is absorbed partly by the deformation of panel 10 and partly by the stroking action of the fastener assembly. An actual construction would use a number of energy-absorbing fasteners between panel 10 and structural member 15.

Figure 3:
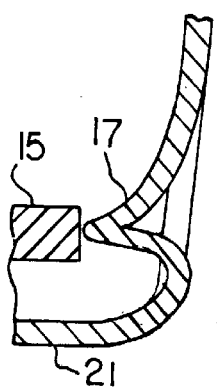
FIG. 3 is an enlarged fragmentary sectional view of a structural detail showing a portion of the fastener system during installation.

The fastener assembly comprises a male fastener element 18 fastened to panel 10, and a socket 16 geometrically attached to element 18. In preferred practice of the invention, socket 16 is attached to member 15 by four deformable spring clips 17 integral with the socket. As shown in FIGS. 1 and 3, the socket 16 is preferably an inverted V-shape with flat wall 19 having end flanges 21 adapted to abut one face of structural member 15. Member 15 has a rectangular mounting opening (hole) 23 sized to enable the flanges 21 on socket 16 to seat flatwise against the face of member 15. Each spring clip 17 is deformable so that when the V-shaped socket 16 is passed through opening 23 during assembly, the clips deform, as seen in FIG. 3, and then snap back to the FIG. 1 configuration, thereby attaching the socket 16 to member 15. Those skilled in the art will recognize that the socket 16 can be U-shaped, cylindrically shaped, or another shape, as long as it can be installed into the member 15, and so that the sides are convergent in the direction of fastener element movement.

Opening 23 is slightly larger than the corresponding width of the V-shaped socket, such that socket 16 can adjust laterally to compensate for manufacturing tolerances in the relative position of male fastener element 18 to structural member 15. The socket is thus better enabled to more accurately align with fastener element 18 on a common axis 25, allowing a more repeatable means of energy absorption.

Socket 16 comprises two convergent flat surfaces 22 on the walls 19 having slots 24 therein for accommodating latch members 26 on the terminal end of fastener element 18; latch members 26 prevent panel 10 from pulling away from member 15.

Fastener element 18 comprises a central trunk 28 and a plurality of spaced parallel deflectable walls 30 extending laterally from the trunk. Each deflectable wall 30 comprises two coplanar wall areas extending in opposite directions from trunk 28 so that wall edges 27 are located beyond the entrance mouth of socket 16 when fastener element 18 is in the FIG. 1 position. The leading wall 30a in the wall system is preferably somewhat thicker, and therefore stiffer, than the remaining walls 30, such that wall 30a normally prevents fastener element 18 from moving beyond the FIG. 1 position deeper into socket 16 during installation and normal use. Each wall 30 (or 30a) is rectangular when viewed along the trunk axis, whereby the deflectable walls have extensive surface areas thereof frictionally engageable with convergent flat surfaces 22 when fastener element 18 is moved into the socket, as depicted in FIG. 2. Walls 30, 30a hingedly fold toward trunk 28 in opposition to the resilience of the wall material. Fastener element 18 is preferably a one piece plastic molding formed of a resilient plastic material.

Latch members 26 are integral portions of the one piece plastic molding. Each latch member has a depth slightly less that the depth of each slot 24, whereby the latch members can move freely within the slots between the FIG. 1 and FIG. 2 positions. The latch members prevent fastener element 18 from pulling out of socket 16.

FIG. 1 represents the normal position of fastener element 18. In the event of an impact of a predetermined magnitude on trim panel 10, some of the impact may be absorbed by panel 10. Some of the impact, however, can be transmitted through the panel to fastener element 18, whereby the fastener element is driven deeper into socket 16, as depicted in FIG. 2.

Figure 4:
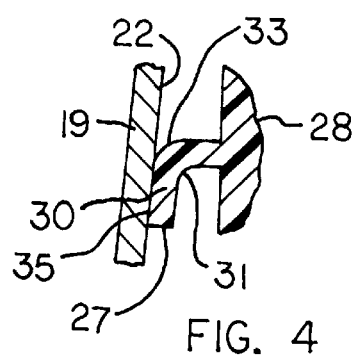
FIG. 4 is an enlarged fragmentary sectional view of a structural detail used in the FIG. 2 assembly.
Figure 5:
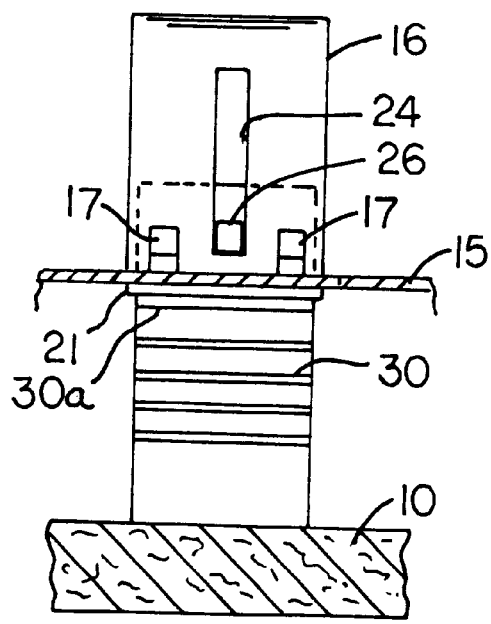
FIG. 5 is a side elevational view of the FIG. 1 fastener assembly, taken on a reduced scale in the direction of arrow 5 in FIG. 1.

As fastener element 18 moves from its normal FIG. 1 position deeper into socket 16 the transverse walls 30, 30a hingedly deflect to the folded conditions depicted in FIG. 2. Referring to FIG. 4, the hinging motion causes the inner concave surface 31 of the hinge wall to undergo compression; the outer convex surface 33 of the hinge wall is in tension. The compression-tension forces cause the outer face area 35 of the wall to have forcible contact with socket surface 22. The increased frictional contact pressure enhances the energy absorption of the fastener system.

Walls 30, 30a are preferably spaced along trunk 28 so that outer edges 27 on one wall are in close proximity to convex surfaces 33 on the following wall 30 when walls 30, 30a are in the FIG. 2 condition. The aim is to optimize the socket surfaces 22 in frictional contact with deflectable walls 30, 30a. Walls 30, 30a are designed to be tunable, such that the size, shape, thickness and wall spacing can be varied to produce desired resistances for particular impact situations and particular vehicles.

Figure 6:
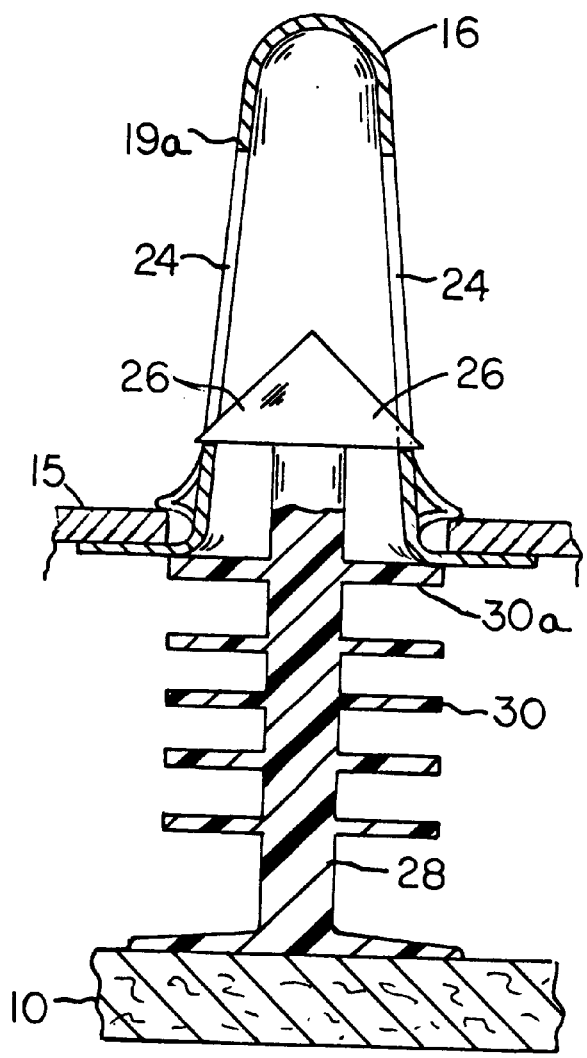
FIG. 6 shows a second form that the invention can take.

FIG. 6 shows a further form that the invention can take. In this case, the socket has a frusto-conical configuration, and each deflectable wall 30, or 30a, has a circular plan configuration. Trunk 28 can have a circular cross section. The latch members 26 are formed by a single triangular wall having a depth corresponding to the depths of slots 24 formed in the frusto-conical socket wall 19a. Operationally, the FIG. 6 embodiment performs in essentially the same fashion as the previously described embodiment of FIGS. 1 and 2.

The drawings necessarily show specific forms of the invention. However, it will be appreciated that the invention can be practiced in various forms and configurations.

I claim:

1. An energy-absorbing fastener system, comprising a socket having internal frictional surfaces, and a male fastener element movable into said socket in response to a predetermined actuation load applied to the fastener element; said fastener element comprising a central trunk and plural deflectable walls spaced therealong for frictional engagement with the socket frictional surfaces as said fastener element moves deeper into the socket; said socket having plural slots in said internal frictional surfaces; said fastener element having plural laterally-extending latch members located in said slots for normally preventing said fastener element from pulling out of said socket.

2. The fastener system of claim 1, wherein said plural deflectable walls comprise a leading wall positionable at an entrance end of said socket to normally prevent movement of said fastener element into said socket when a load less than the predetermined actuation load impinges upon the fastener system.

3. The fastener system of claim 1, wherein said socket frictional surfaces comprise opposed surface areas convergent in the direction of fastener element movement; each deflectable wall being integral with said central trunk; each deflectable wall extending generally normal to said trunk prior to entry into said socket; each deflectable wall being capable of hingedly deflecting to a folded condition by frictional engagement with a socket frictional surface; each said deflectable wall having a major portion of its surface in frictional engagement with the socket frictional surface when said deflectable wall is in the folded condition.

4. An energy-absorbing fastener assembly for positioning an automotive trim panel in spaced relation to an automotive structural member, comprising:

a socket installed in the structural member; said socket having internal frictional surfaces;

a male fastener element securable to a trim panel for partial disposition within said socket; said fastener element having latch means thereon engageable with said socket for normally preventing the trim panel from pulling away from the structural member;

said male fastener element being movable deeper into said socket from its normal position in response to a predetermined actuation load applied to the trim panel;

said fastener element comprising a central trunk and plural deflectable walls spaced therealong for frictional engagement with the socket frictional surfaces as said fastener element moves deeper into the socket from its normal position;

said socket having plural longitudinal slots in said internal frictional surfaces; said fastener element latch means comprising plural latch members extending from said trunk into said longitudinal slots.

5. The fastener assembly of claim 4, wherein said plural deflectable walls comprise a leading wall positionable at an entrance end of said socket to normally prevent movement of said fastener element into said socket beyond its normal position.

6. An energy-absorbing fastener system, comprising a socket having internal frictional surfaces, and a male fastener element movable into said socket in response to a predetermined actuation load applied to the fastener element; said fastener element comprising a central trunk and plural deflectable walls spaced therealong for frictional engagement with the socket frictional surfaces as said fastener element moves deeper into the socket; said internal frictional surfaces being convergent in the direction of fastener element movement; each deflectable wall being integral with said central trunk; each deflectable wall extending generally normal to said trunk prior to entry into said socket; each deflectable wall being capable of hingedly deflecting to a folded condition by frictional engagement with a socket frictional surface; each said deflectable wall having a major portion of its surface in frictional engagement with the socket frictional surface when said deflectable wall is in the folded condition.

* * * * *